(12) United States Patent
Wang et al.

(10) Patent No.: US 7,885,469 B2
(45) Date of Patent: Feb. 8, 2011

(54) ENCODED HIGH DYNAMIC RANGE TEXTURES

(75) Inventors: Xi Wang, Beijing (CN); Peter-Pike J. Sloan, Bellevue, WA (US); Li-Yi Wei, Redwood City, CA (US); Xin Tong, Beijing (CN); Baining Guo, Beijing (CN)

(73) Assignee: Microsoft Corporation, Redmond, WA (US)

( * ) Notice: Subject to any disclaimer, the term of this patent is extended or adjusted under 35 U.S.C. 154(b) by 903 days.

(21) Appl. No.: 11/419,697

(22) Filed: May 22, 2006

(65) Prior Publication Data

US 2007/0269115 A1 Nov. 22, 2007

(51) Int. Cl.
*G06K 9/36* (2006.01)

(52) U.S. Cl. ..................................... 382/232
(58) Field of Classification Search ................. 382/168, 382/232–253; 345/582–588, 552, 538, 555
See application file for complete search history.

(56) References Cited

U.S. PATENT DOCUMENTS

| | | | | |
|---|---|---|---|---|
| 4,887,151 A | * | 12/1989 | Wataya | ........................ 358/539 |
| 5,068,644 A | * | 11/1991 | Batson et al. | ................ 345/601 |
| 5,325,449 A | | 6/1994 | Burt et al. | |
| 5,367,629 A | | 11/1994 | Chu et al. | |
| 5,418,895 A | * | 5/1995 | Lee | ............................ 345/604 |
| 5,706,216 A | | 1/1998 | Reisch | |
| 5,805,303 A | | 9/1998 | Imaizumi et al. | |
| 5,852,673 A | * | 12/1998 | Young | ........................ 382/164 |
| 5,909,251 A | | 6/1999 | Guichard et al. | |
| 5,930,397 A | | 7/1999 | Tsujii et al. | |
| 6,281,904 B1 | | 8/2001 | Reinhardt et al. | |
| 6,438,261 B1 | | 8/2002 | Moshe et al. | |
| 6,538,659 B2 | * | 3/2003 | Fujimura et al. | ............ 345/582 |
| 6,539,126 B1 | | 3/2003 | Socolinsky et al. | |
| 6,658,146 B1 | * | 12/2003 | Iourcha et al. | ............... 382/166 |

(Continued)

FOREIGN PATENT DOCUMENTS

WO WO2006017233 A1 2/2006

(Continued)

OTHER PUBLICATIONS

Mantiuk, et al., "Perception-motivated high dynamic range video encoding", ACM Transactions on Graphics,vol. 23 , Issue 3, Aug. 2004, pp. 733-741.*

(Continued)

*Primary Examiner*—Wesley Tucker
*Assistant Examiner*—Mark Roz
(74) *Attorney, Agent, or Firm*—Lee & Hayes, PLLC

(57) ABSTRACT

Encoded HDR textures are described. In one aspect, a HDR image comprised is preprocessed such that HDR information is represented in a single color channel. The preprocessed image is quantized in view of two luminance ranges to retain HDR in the single color channel. Each block of quantized channel information is then encoded across two textures (encoded HDR textures). Specifically, when encoding a block of the quantized information, pixels in a first range of the two luminance ranges are put into a color channel associated with a first texture. Additionally, pixels in a second range of the two luminance ranges are stored into a color channel associated with a second texture.

16 Claims, 5 Drawing Sheets

U.S. PATENT DOCUMENTS

| | | | |
|---|---|---|---|
| 6,898,331 | B2 | 5/2005 | Tiana |
| 7,298,379 | B2 * | 11/2007 | Xu et al. .................... 345/589 |
| 2002/0181762 | A1 | 12/2002 | Silber |
| 2003/0208116 | A1 | 11/2003 | Liang et al. |
| 2004/0028283 | A1 | 2/2004 | Prosi |
| 2004/0258322 | A1 | 12/2004 | Hong et al. |
| 2005/0078881 | A1 | 4/2005 | Xu et al. |
| 2005/0089239 | A1 | 4/2005 | Brajovic |
| 2005/0094887 | A1 | 5/2005 | Cakir et al. |
| 2005/0122332 | A1 * | 6/2005 | Boyd et al. ................. 345/501 |
| 2005/0129110 | A1 * | 6/2005 | Marquant et al. ...... 375/240.03 |
| 2005/0163389 | A1 | 7/2005 | Ohmi et al. |
| 2005/0185826 | A1 | 8/2005 | Georgescu et al. |
| 2005/0232512 | A1 | 10/2005 | Luk et al. |
| 2005/0254722 | A1 | 11/2005 | Fattal et al. |
| 2005/0265452 | A1 | 12/2005 | Miao et al. |
| 2005/0270784 | A1 | 12/2005 | Hahn et al. |
| 2005/0276498 | A1 | 12/2005 | Chen et al. |
| 2006/0002611 | A1 | 1/2006 | Mantiuk et al. |
| 2006/0062299 | A1 | 3/2006 | Park et al. |
| 2006/0104524 | A1 | 5/2006 | Reid et al. |
| 2007/0076971 | A1 * | 4/2007 | Roimela et al. ............. 382/251 |

FOREIGN PATENT DOCUMENTS

| | | |
|---|---|---|
| WO | WO2006018658 A2 | 2/2006 |

OTHER PUBLICATIONS

Strom et al., "iPACKMAN: high-quality, low-complexity texture compression for mobile phones", Proceedings of the ACM Siggraph/Eurographics conference on Graphics hardware, 2005, pp. 63-70.*

Beers et al., "Rendering from compressed textures," Proceedings of the 23rd annual conference on Computer graphics and interactive techniques, 1996, pp. 373-378.*

Ward, et al., "Subband encoding of high dynamic range imagery", Applied Perception in Graphics and Visualization, vol. 73, 2004, pp. 83-90.*

Larson, et al., "The LogLuv Encoding for Full Gamut, High Dynamic Range Images," Journal of Graphics Tools, 1998.*

Antunez, "Gradient-Based Dynamic Range Compression: Introduction", retrieved at http://www.scien.stanford.edu/class/psych221/projects/03/eantunez/introduction.html on May 1, 2006, written on Mar. 10, 2003, 2 pages.

Bala, et al., "Information-Preserving Imaging for Heterogeneous Networked Displays", CHI'06 International Conference, Apr. 22-27, 2006, 4 pages, Montreal, Canada.

Fattal, et al., "Gradient Domain High Dynamic Range Compression", ACM SIGGRAPH, 2002, 8 pages.

Gooch, et al., "Color2Gray: Salience-Preserving Color Removal", ACM SIGGRAPH, 2005, 6 pages, vol. 24, No. 3.

Socolinsky, "Dynamic range constraints in image fusion and visualization", Proceedings of Signal and Image Processing 2000, Nov. 2000, 6 pgs, Las Vegas, NV.

Girod et al., "Recent Advances in Video Compression", IEEE, 1996, pp. 1-4.

Vaisey, et al., "Image Compression with Variable Block Size Segmentation", IEEE Transactions on Signal Processing, vol. 40, No. 8, Aug. 1992, pp. 2040-2060.

Wang, et al., "Salience Preserving Image Fusion with Dyanmic Range Compression", pp. 1-4.

* cited by examiner

ENCODED HIGH DYNAMIC RANGE TEXTURES

BACKGROUND

Dynamic range is defined as the ratio between the highest and lowest light intensity in a scene. Illumination in natural and simulated scenes covers a wide dynamic range, often over 4 orders of magnitude. This high dynamic range (HDR) generally cannot be faithfully reproduced by traditional low dynamic range (LDR) display and printing systems. This is because LDR systems are typically designed around 8-bit per channel images that cover only 2 orders of magnitude. As a result, and due to recent improvement in capture and display devices, HDR images, which provide a more faithful representation of scene illumination as compared to traditional LDR images, are becoming increasingly popular. For example, HDR images are typically used to represent distant illumination via environment texture maps. Additionally, advances in rendering algorithms and imaging devices have allowed real-time applications on graphics hardware, such as games, to utilize HDR images. Yet, HDR images consume significantly more storage than traditional LDR images. This presents challenges for applications running on graphics hardware with limited texture memory.

SUMMARY

Encoded HDR textures are described. In one aspect, a HDR image is preprocessed such that HDR information is represented in a single color channel. The preprocessed image is quantized in view of two luminance ranges to retain HDR in the single color channel. Each block of quantized channel information is then encoded across two textures (encoded HDR textures). Specifically, when encoding a block of the quantized information, pixels in a first range of the two luminance ranges are put into a color channel associated with a first texture. Additionally, pixels in a second range of the two luminance ranges are stored into a color channel associated with a second texture.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Systems and methods for encoded HDR textures are described. The systems and methods generate and render encoded HDR textures representing encoded HDR images. To this end, the systems and methods decompose (segment) a HDR image into several components. In one implementation, each component has no more than 8-bits per channel. The systems and methods then encode each component separately via a texture compression algorithm that is performed one time and conducted offline on a processor. More particularly, an HDR input is converted from RGB color space into YCbCr color space. The converted input then divides CbCr by Y so that all the high dynamic range luminance information is concentrated in the Y channel only. The YCbCr channels are then quantized for encoding into fixed-point DXT channels. Since Y is the only channel that contains HDR information, more bits are allocated for Y than CbCr. Finally, YCbCr channels are mapped into the channels of DXT to allow native hardware filtering, decoding. And rendering. In one implementation, the decompression process is implemented on GPU via a pixel program.

These and other aspects of the systems and methods for high dynamic range textures are now described in greater detail.

DESCRIPTION

An Exemplary System

Although not required, the systems and methods for encoded HDR textures are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
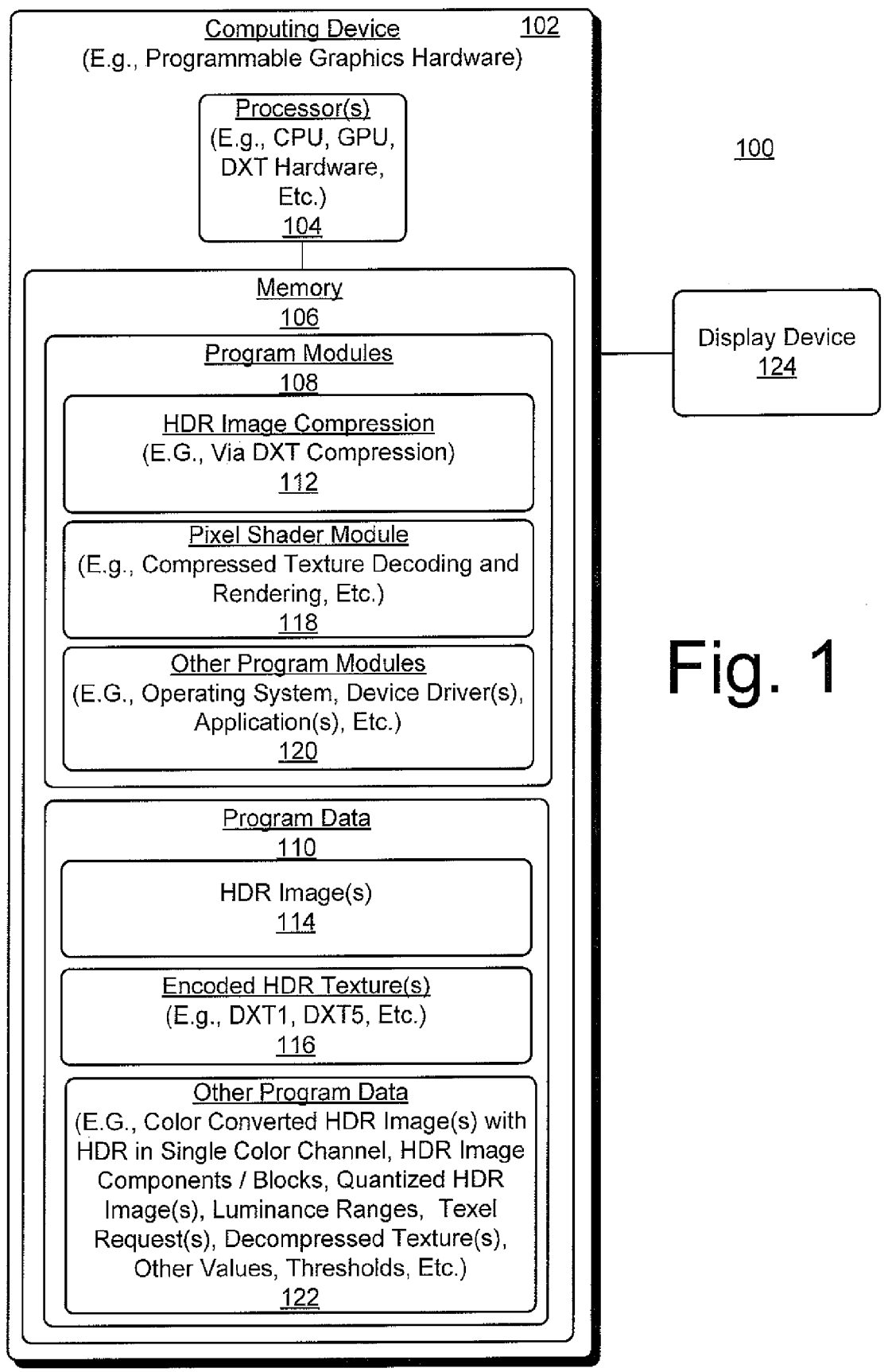
FIG. 1 illustrates an exemplary system for encoded HDR textures, according to one embodiment.

FIG. 1 illustrates an exemplary system 100 for encoded HDR textures, according to one embodiment. System 100 generates and renders encoded HDR textures ("HDR textures) representing encoded HDR images. To these ends, system 100 includes a computing device 102. Computing device 102 represents any type of computing device such as a programmable graphics hardware computing device (e.g., a gaming device), a personal computer, a server, a laptop, etc. Computing device 102 includes one or more processors 104 such as a central processing unit coupled to a graphics processing unit. Processor(s) 104 are coupled to system memory 106, which includes RAM and ROM. System memory 106 includes computer-program modules ("program modules") 108 and program data 110. Processor(s) 104 fetch and execute computer-program instructions from respective ones of the program modules 108. Program modules 108 include, for example, HDR image compression module 112 for compressing HDR images 114 into HDR textures 116 (encoded HDR textures in a hardware compatible format), pixel shader module 118 for decompressing and rendering encoded HDR textures 116. Program modules 108 also includes "other program modules" 120 such as an operating system, device driver(s), application(s) that utilize HDR image compression module 112 to preprocess/compress HDR images 114, and/or utilize pixel shader module 118 for real-time HDR image decompression and rendering of encoded HDR textures 116 onto a display device 124, etc.

Compression

Color Space Conversion

Given a HDR image 114 in 32-bit floating point format (i.e., $I_{R32G32B32}$) an application (e.g., a respective module of "other program modules" 120) utilizes HDR image compression module 112 ("image compression module 112") to first convert HDR image 114 into the YCbCr color space, $T_{Y32Cb32Cr32}$. This is accomplished using one of multiple known color conversion formulas. (For purposes of exemplary illustration, such color converted HDR image(s) are shown as respective portion(s) of "other program data" 122). In addition, image compression module 112 divides both Cb and Cr by Y so that only Y is HDR. That is, after color converting HDR image 114, the HDR is the Y channel only. This allows for allocation of additional bits for the Y channel than the CbCr channels in the compression process. As a result, image compression module 112 processes the Y channel differently from the Cb and Cr channels during compression operations.

Dynamic Range Quantization

After color conversion, the floating-point YCbCr values are changed into a form suitable for the compression algorithm being used. In this implementation, the DXT compression algorithm is utilized, although other compressions algorithms could have also been used. In this implementation, and since DXT supports only 8-bit fixed point values, original high dynamic range floating-point is represented as fixed-point. To accomplish this, the number of fixed-point uniform quantization ranges to use is determined, and a technique is presented to distribute the original high dynamic range values into these multiple ranges. Given a fixed number of quantization bits as a budget, usually the more uniform quantization ranges, the lower the quantization error, but at the expense of more data for bookkeeping the min/max range values. Computing device 100 allocates different number ranges for Y and CbCr as follows.

First, since CbCr was divided via Y in the color conversion step, CbCr are no longer in high dynamic range, i.e. CbCr values of the entire image lie in roughly the same exponent range. As a result, only their mantissa parts are preserved, essentially reducing the conversion process into a uniform quantization. Second, for the Y channel, since it is still in high dynamic range, it is likely not enough to use only one uniform quantization interval. For example, using a 2×6-bit uniform-quantized interval (with possibly different sizes) produces much better result than using only a 1×12-bit uniform-quantized interval, even though the number of bits are the same in both cases.

Figure 2:
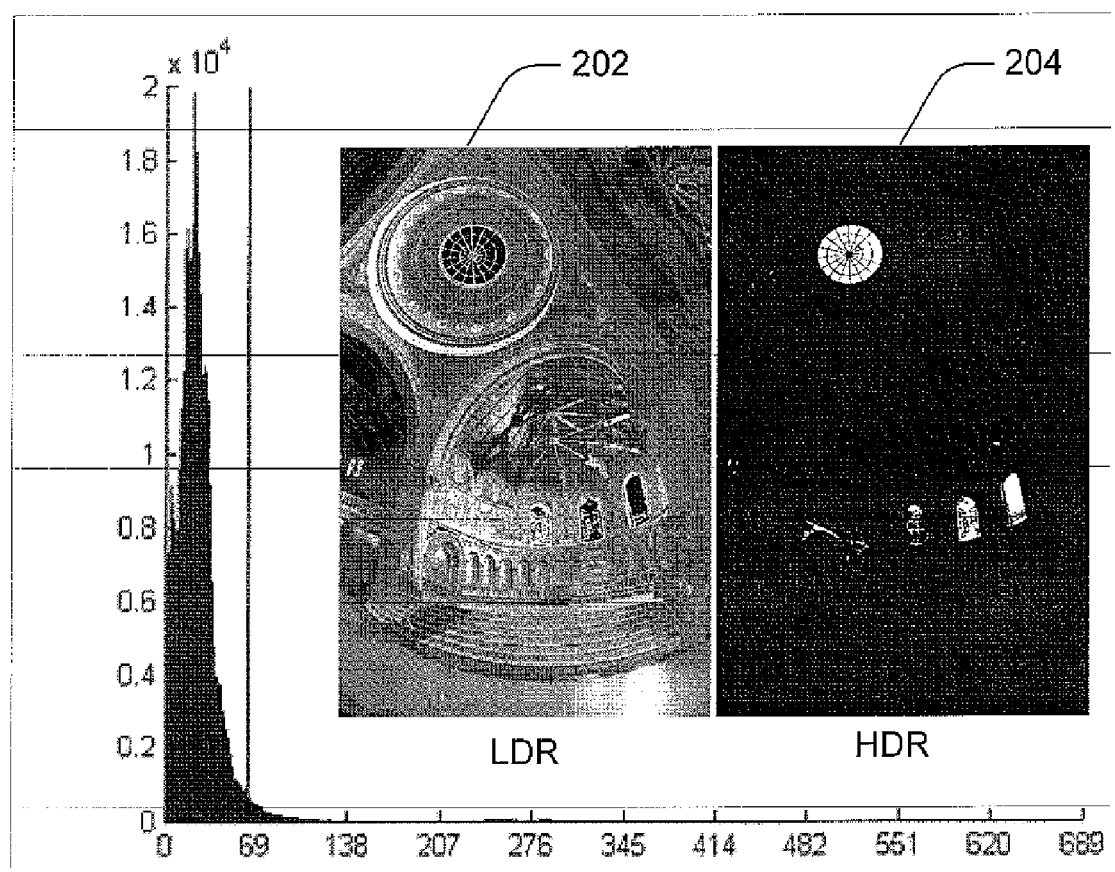
FIG. 2 shows an exemplary histogram of the luminance channel for a scene, wherein a HDR image and a LDR image respectively indicate Y in a first luminance range, according to one embodiment.

In this implementation, computing device 102 (e.g., image compression module 112) uses two uniform quantization intervals to address both quality and storage for DXT compression operations. To quantize Y, the range of luminance is divided into two zones, $[t_{min}, t_1]$ and $[t_1, t_{max}]$. Each zone is quantized them separately, for example, as shown in FIG. 2. Parameter $t_1$ is selected so that the total quantization error of the two zones is minimized.

In one implementation, image compression module 112 computes $t_1$ by minimizing the following error function:

$$E(t_1) = n_l(t_1) \times (t_1 - t_{min}) + nh(t_1) \times (t_{max} - t_1) \qquad [1],$$

where $n_l$ and $n_h$ are the number of luminance pixels falling into the $[t_{min}, t_1]$ and $[t_1, t_{max}]$ regions, respectively. (Note that both $n_l$ and $n_h$ are functions of $t_1$. In this implementation, a linear search of $t_1$ is utilized for optimization.

FIG. 2 shows an exemplary histogram 200 of the luminance channel for a scene, wherein a HDR image 202 and a LDR image 204 respectively indicate Y in the range $[t_1, t_{max}]/[t_{min}, t_1]$. Referring to FIG. 2, notice that the histogram 200 is highly non-uniform, with most of the values being clustered around a single peak and biased towards the lower luminance values. Natural HDR images 114 typically have a similar distribution in the Y channel. Based on this observation, image compression module 112 divides the range of luminance into two zones, $[t_{min}, t_1]$ and $[t_1, t_{max}]$, as shown (for example) in FIG. 2. For values within $[t_{min}, t_1]$, the application uniformly quantizes the values into 12 bits. Similarly, for values within $[t_1, t_{max}]$, image compression module 112 uniformly quantizes the values into 12 bits as well. The value $t_1$ is selected such that the total quantization error of the two zones is minimized.

Multiple different embodiments are now described to map the quantized YCbCr channels (quantize HDR images) into channels of two DXT textures (e.g., encoded HDR textures 116). For example, in one implementation, the encoding techniques utilize a DXT1 compression algorithm to achieve a 6:1 compression ratio for FP16 RGB inputs (i.e., input HDR image(s) 114). In another implementation, the described encoding techniques utilize a DXT5 compression algorithm that doubles the data size of DXT1. It can be appreciated that although these two compression algorithms are described, different compression algorithms (e.g., (Although the process for DXT1 is described, this same process can be easily adapted for other variations of DXT (e.g., DXT2 Through DXT4, and/or so on). and corresponding YCbCr mappings could also be implemented by computing device 102 to encode HDR images into encoded HDR textures.

DXT1 Encoding

In this implementation, image compression module 112 operates on individual 4×4 pixel blocks independently during the encoding operations, although different block sizes could be used. Each 4×4 block is represented by two 16-bit $R_5G_6B_5$ colors. In this implementation, an opaque compression mode is utilized, although other modes could also be utilized. Each 4×4 block is compressed into 64 bits via DXT1. To encode $I_{Y12Cb5Cr5}$ into DXT1, image compression module 112 maps the YCbCr channels into the DXT1 $R_5G_6B_5$ channels.

A budget of two DXT1 textures (encoded HDR textures 116) provides 32 bits ($2 \times R_5G_6B_5$) in total to encode the YCbCr values. To avoid cross-channel pollution, bit allocations for YCbCr are aligned with respect to the $R_5G_6B_5$ bit boundaries. In one implementation, all 32-bits are utilized for encoding without any waste. This, together with the bit alignment requirement, permits a variety of encoding such as (22-bit Y, 5-bit Cb, 5-bit Cr). In this implementation, however, all 32 bits of information are not used to allow native hardware filtering.

For instance, if pixels in both $[t_{min}, t_1]$ and $[t_1, t_{max}]$ are mixed in a same 4×4 pixel block, which could happen in the transition regions from low to high intensity zones, then the bilinear or trilinear hardware texture filtering will produce incorrect blending for the Y channel. (In one implementation, this is corrected by custom filtering operations inside a pixel shader program, which is slow). However, in this implementation, the pixel shader (e.g., pixel shader 118) does not perform custom filtering. Rather, image compression module 112 maps the YCbCr channels into the DXT1 $R_5G_6B_5$ channels by encoding $I_{Y12Cb5Cr5}$ into two DXT1 textures (respective encoded HDR textures 116). Instead of mixing pixels in different zones ($[t_{min}, t_1]$ and $[t_1, t_{max}]$), the pixels are placed in different color channels. This allows native hardware filtering without risk of incorrect blending of values in different zones ($[t_{min}, t_1]$ and $[t_1, t_{max}]$). In view of this solution, a developer can decide not to use conditional code and/or branching in the decompression operations of pixel shader module 118.

Figure 3:
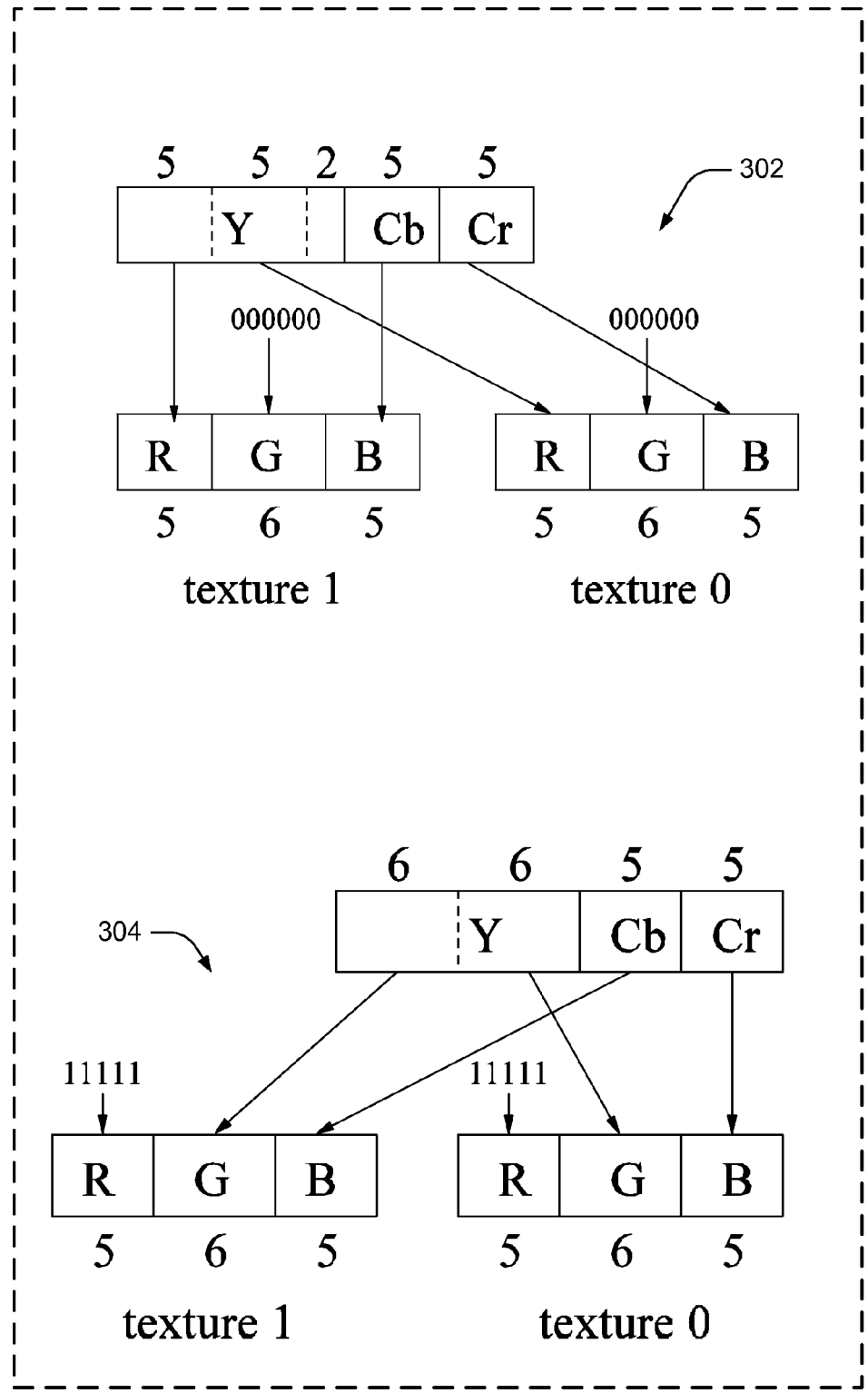
FIG. 3 shows exemplary HDR image to HDR texture DXT1 encodings that are based on luminance ranges of the Y channel, according to one embodiment.

FIG. 3 shows exemplary HDR image 114 to HDR texture 116 encodings 300 (i.e., from $I_{Y12Cb5Cr5}$ into two encoded HDR textures 116 (texture 1 and texture 0)) that are based on the luminance range of the Y channel, according to one embodiment. Referring to FIG. 3, encoding 302 shows $Y \in [t_{min}, t_1]$, and encoding 304 shows $Y \in [t_1, t_{max}]$ (the bit width for each field is indicated). As shown, image compression module 112 maps the Cb/Cr channels into the indicated B channels, and the Y channel is mapped into either two R or two G channels, depending on the range of the Y channel. Specifically, let the Y channel have a value of t. If t lies in $[t_{min}, t_1]$, image compression module 112 puts $(t-t_{min})/(t_1-t_{min})$ in R and zero (0) in G. (Note that the two least significant bits are lost during the conversion process). On the other hand, if t lies in $[t_1, t_{max}]$, image compression module 112 puts one (1) in R and $(t-t_1)/(t_{max}-t_1)$ in G. Please note that using this algorithm, compression module 112 performs decompression independent of any conditional branching.

DXT5 Encoding

The described DXT1 encoding scheme packs Y and CbCr together inside same RGB vectors. As a result, cross-channel interference may occur during compression operations. Specifically, the values of Y and CbCr will cross (interfere) with each other during the determination of two $R_5G_6B_5$ representative values for the entire 4×4 block. To avoid such cross interference, one implementation of computing device 102 (e.g., HDR image compression module 112) utilizes two DXT5 textures (shown as respective ones of encoded HDR textures 116) instead of DXT1 textures. This implementation routes (maps) CbCr into the two DXT5 alpha channels, as illustrated in FIG. 4.

Figure 4:
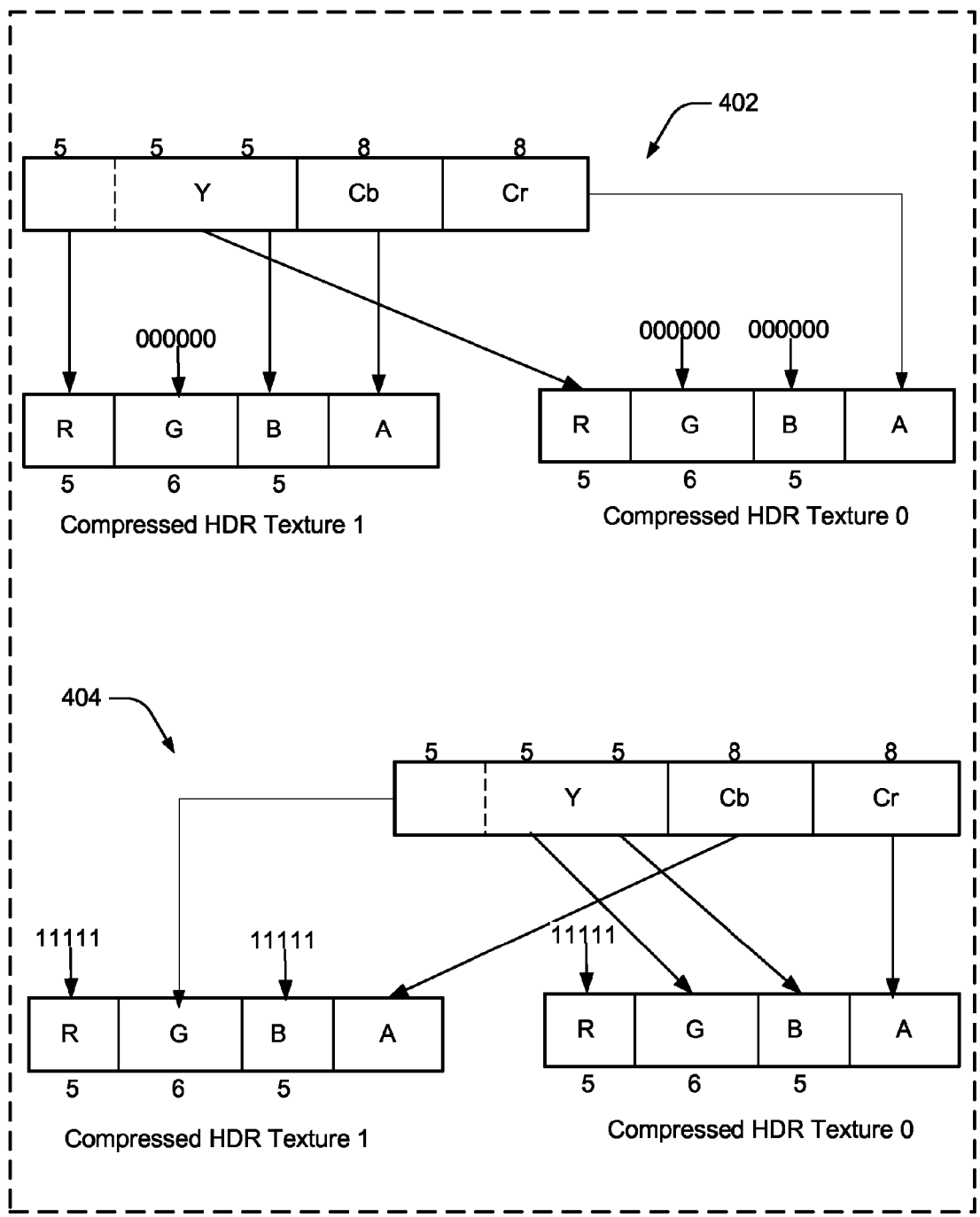
FIG. 4 shows exemplary HDR image to HDR texture DXT5 encodings that are based on luminance ranges of the Y channel, according to one embodiment.

FIG. 4 shows exemplary HDR image to HDR texture DXT5 encodings that are based on luminance ranges of the Y channel, according to one embodiment. Since DXT5 interpolates the RGB and A channels independently, no cross interference occurs with the illustrated DXT5 encoding. More particularly, encoding 402 shows $Y \in [t_{min}, t_1]$, and encoding 304 shows $Y \in [t_1, t_{max}]$ (the bit width for each field is indicated). As shown, image compression module 112 maps the Cb/Cr channels into the indicated A channels, and the Y channel is mapped into respective textures 116 using either BR channels or GB channels, depending on the range of the Y channel.

As shown in FIG. 4, the DXT5-based HDR texture encodings provides the following precisions for fields: 15/17 bits for the Y in $[t_{min}, t_1]/[t_1, t_{max}]$, as compared to 10/12 bits, and 8-bit precision for CbCr instead of 5-bit as in the described DXT1 encoding.

Decompression

System 100 implements a decompression algorithm for real-time rendering of encoded HDR textures 116. In one implementation, the decompression algorithm is imple-mented as a short pixel shader program module (e.g., pixel shader module 118) on programmable graphics hardware (e.g., computing device 102), although other implementations are possible. In one implementation, the decompression algorithm leverages DXT hardware for decompression and native texture filtering. In another implementation, different decompression hardware and texture filtering operations are utilized. Native DXT hardware can properly filter LDR (8 bit) compressed textures (DXT is a compressed texture format.) The above discussed technique of HDR image compression module 112 leverages this ability to encode HDR textures (>8 bits channel, often 32 bit or 16 bit floating point) and properly filter the Y channel of a HDR image (by carefully encoding it into multiple DXT textures, and running a pixel shader on the filtered results.) The chroma channels are not linearly filtered, but the error in such a case does not appear to be perceptually significant for chroma.

In this implementation, rendering from encoded HDR textures 116 is accomplished as follows. An application executing on computing device 102 communicates texel requests(s) to hardware accelerated (HA) pixel shader module 118 ("pixel shader 118"). Responsive to each texel request, pixel shader 118 fetches corresponding low and high bit values from the two corresponding DXT textures 116, respectively. The DXT decompression is performed by the pixel shader 118 automatically. To this end, pixel shader 118 combines the low and high bit values into a single value for $I_{Y12Cb5Cr5}$ via proper arithmetic, as now described.

From equation [1], if t lies in $[t_{min}, t_1]$, the value of t can be reconstructed according to the following: $t=R(t_1-t_{min})+t_{min}$. If t lies in $[t_1, t_{max}]$, the value of t can be reconstructed as $t=G(t_{max}-t_1)+t_1$. Since these two equations are different, there is a choice depending on the original range between equations to utilize to reconstruct t; implementing this choice would result in conditional code. To avoid such conditional code, in this implementation, the texture decoder module (e.g., pixel shader 118) utilizes the following equation to reconstruct the requested texel(s) t independent of the original range as follows:

$$t = G \times (t_{max} - t_1) + R \times (t_1 - t_{min}) + t_{min} \quad [2]$$

It is now shown that the exemplary HDR image 114 to HDR texture 116 encoding operations associated with the exemplary illustration of FIG. 3 provide for reconstruction of the original HDR image 114 from a encoded HDR texture 116 via equation [2].

If t lies in $[t_{min}, t_1]$, we have G=0, so $t=R(t_1-t_{min})+t_{min}$, which is the same as the original encoding. Otherwise, t lies in $[t_1, t_{max}]$, and we have R=1, so $G(t_{max}-t_1)+t_1$, which is also the same as the original encoding. Thus, this described encoding achieves the simultaneous goals of (1) avoiding conditional code and (2) texture filtering via native hardware; all the pixel shader module 118 needs to do is to properly combine the values from the R and G channels.

In view of the above, pixel shader 118 converts $I_{Y12Cb5Cr5}$ back to $I_{Y32Cb32Cr32}$ by interpolating from the proper zone $[t_{min}, t_1]$ or $[t_1, t_{max}]$. Pixel shader 118 then converts $I_{Y32Cb32Cr32}$ into the final RGB value $I_{R32G32B32}$ by inverting the compression process as described above. TABLE 1 shows exemplary pseudo-code for pixel shader 118 decompression and rendering operations, according to one embodiment.

TABLE 1

EXEMPLARY PSEUDOCODE FOR DECOMPRESSION
AND RENDERING

```
float3 HDRDecode (in float3 vTex1, in float3 vTex0)
{
    // reconstruct in YCbCr space
    // ranges and mins of Y, Cb and Cr channels are global constants
    float3 vYCbCr = 0.0f;
    vYCbCr.g =  vTex1.r * g_YRangeLDR + vTex0.r *
                g_YRangeLDR/32 + vTex1.g * g_YRangeHDR +
                vTex0.g * g_YRangeHDR/64 + g_YMin;
    vYCbCr.b = vTex1.b * g_CbRange + g_CbMin;
    vYCbCr.r = vTex0.b * g_CrRange + g_CrMin;
    vYCbCr.br = vYCbCr.br * vYCbCr.g;
    Convert to RGB Space;
    // YCbCr2RGB is 3x3 constant matrix
    return mul( YCbCr2RGB, vYCbCr);
}
```

An Exemplary Procedure

Figure 5:
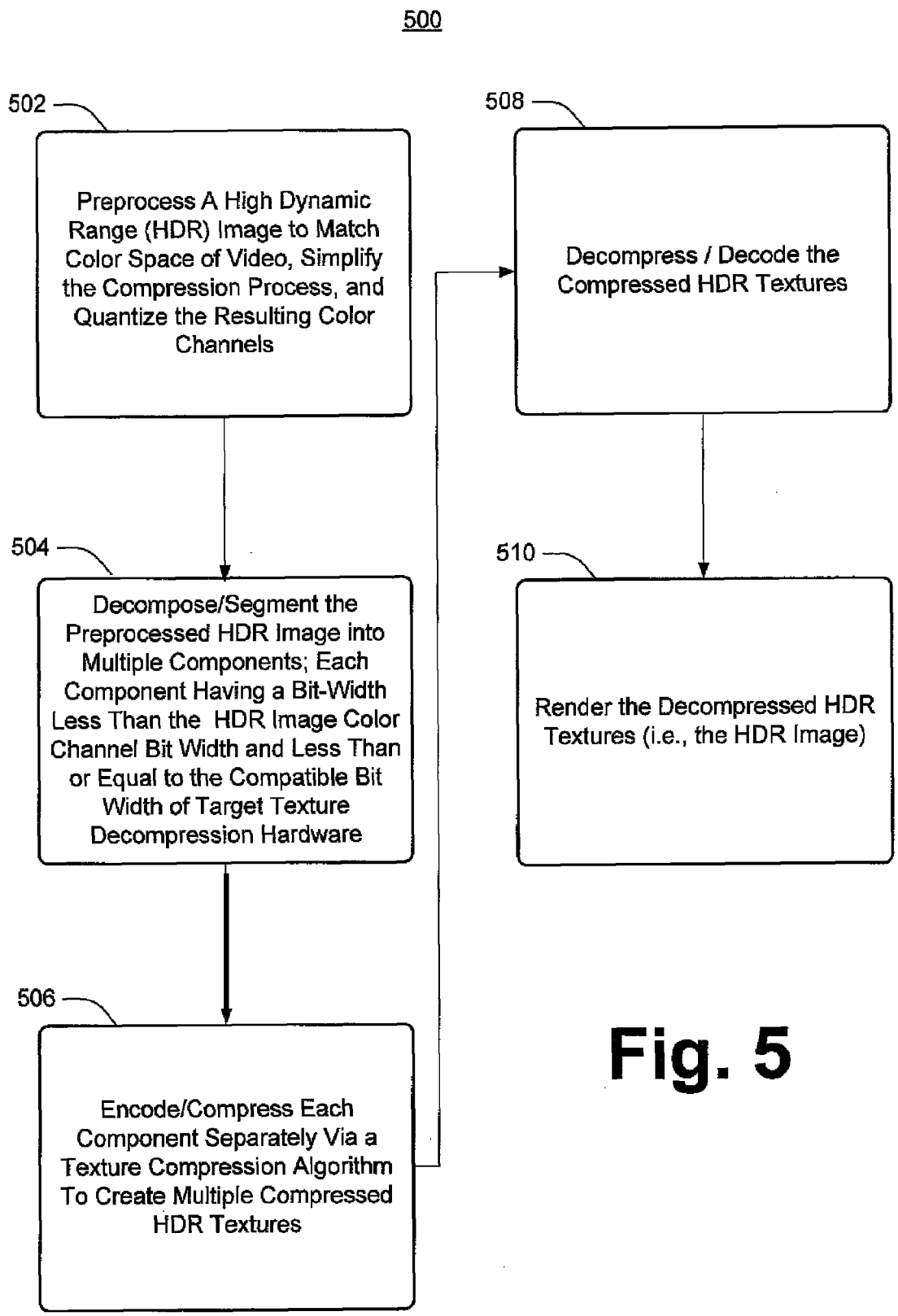
FIG. 5 shows an exemplary procedure for encoded HDR textures, according to one embodiment.

FIG. 5 shows an exemplary procedure 500 for rendering HDR images 114 from encoded HDR textures 116 on graphic hardware, according to one embodiment for purposes of exemplary description, the operations of the procedure are described with respect to the components of FIG. 1. In the description, the left-most digit of a component reference number identifies the particular Figure in which the component first appears.

At block 502, a HDR image 114 is preprocessed to convert the color space of the HDR image, optimize the compression process, and quantize resulting color channels. In one implementation, HDR image compression module 112 ("image compression module 112") of FIG. 1 preprocesses a HDR image 114 to convert the color space of the HDR image, optimize the compression process, and quantize resulting color channels. In one implementation, the HDR image 114 is converted from a 32-bit RGB color space format to a YCbCr color space that is utilized in video systems. In YCbCr color space, Y is the luma component and Cb and Cr the chroma components. To simplify the compression process, wherein HDR components are processed differently than non-HDR components, these preprocessing operations: (1) divide the color channels so that Y represents HDR; and, (2) quantize the color channels (i.e., to reduce the number of discrete symbols, and thereby, provides more compressible data). These quantization operations do not utilize a single uniform range to uniformly quantize the Y channel values, but rather two zones of luminance ranges that are selected to minimize total quantization error of the two zones.

At block 504, the preprocessed HDR image (i.e., the quantized color channel information) is segmented/decomposed into multiple components/blocks. (These components/blocks are shown as respective portion of "other program data" 122 of FIG. 1). In one implementation, image compression module 112 segments/decomposes the preprocessed HDR image (i.e., the quantized color channel information) into multiple components/blocks. Image compression module 112 decomposes the HDR image 114 such that each resulting component has a bit-width of less than the HDR image color channel bit-width, and less than or equal to the compatible bit-width of the texture compression hardware (i.e., the texture compression hardware used by image compression module 112, which in one implementation is one and the same). In this implementation, the bit-width of a HDR image color channel is 16-bits and the bit-width used by the texture compression hardware is 8-bits (other embodiments directed to different architectures can utilize different bit widths). Thus, in this implementation, each component has no more than 8-bits per channel, and is equal to the number of bits in a target compressed color format (e.g., DXT1 utilizes a 4-bit compressed color format, etc.). In another implementation, each component has a different number of maximum bits per channel as a function of the bit-width used by the texture compression hardware.

At block 506, each component/block is compressed (encoded) separately via a texture compression algorithm to create respective encoded HDR textures 116. In one implementation, image compression module 112 compresses/encodes each component separately via a texture compression algorithm to create respective encoded HDR textures 116. (In this implementation, the compression algorithm is implemented on a processing unit 104 and decompression is performed on graphics hardware 104). The encoding is accomplished such that pixels there were quantized into different respective zones (based on the range of the Y color channel) are placed into different encoded HDR textures 116. In one implementation, these textures 116 are DXT1 textures. In another implementation textures 116 represent different textures such as DXT2 textures, DXT3 textures, etc. Placing pixels associated with different respective zones into corresponding different textures 116 avoids conditional branching and incorrect blending of pixel values in different zones during native hardware filtering operations.

At block 508, responsive to receiving texel (texture pixel) requests from an application, one or more of the encoded HDR textures 116 are decompressed in real-time for rendering onto a display device. In one implementation, responsive to receiving texel (texture pixel) requests from an application executing on computing device 102, pixel shader 118 decompresses one or more of the encoded HDR textures 116 in real-time for rendering onto a display device. In this implementation, these decompression operations are performed using native DXT texture filtering operations. At block 410, an application executing on computing device 102 renders the decoded HDR textures in real-time to a display device (e.g., display device 124 of FIG. 1).

Alternate Embodiments

Compression operations associated with compression module 112 have been described as being implemented on the same computing device 102 as decompression operations associated with pixel shader module 118. In another implementation, however, different respective computing devices implement HDR image 114 to encoded HDR texture 116 compression operations and encoded HDR texture 116 decompression operations.

Additionally, existing texture compression hardware is designed for 8-bit per channel images. As a result, conventional systems do not use compression hardware for floating point HDR images, which usually have at least 16-bits per channel. This makes size disparity between compressed 8-bit textures and uncompressed 16-bit textures even greater. In contrast to such conventional systems, one embodiment of computing device 102 for high dynamic range textures 116 does utilize such conventional texture compression hardware for encoding and HDR image as compressed textures Moreover, images, color channels, hardware, etc. have been described above with respect to certain bit sizes. It can be appreciated that the particular sizes of these objects can be changed according to the particular architecture being implemented. Moreover, although operations associated with components 112 and 118 of FIG. 1 have been described as being hardware accelerated, in another implementation, these operations are not hardware accelerated. In yet another implementation, a subset of the operations associated with the components 112 and 118 are hardware accelerated.

CONCLUSION

Although the systems and methods for high dynamic range textures have been described in language specific to structural features and/or methodological operations or actions, it is understood that the implementations defined in the appended claim are not necessarily limited to the specific features or actions described. Rather, the specific features and operations of system 100 are disclosed as exemplary forms of implementing the claimed subject matter.

The invention claimed is:

1. A computer-implemented method (400) comprising:
representing HDR information from a high dynamic range (HDR) image (114) in a single color channel (122), the HDR image being in YCbCr color space that includes a Y channel representing luma component, a Cb channel and a Cr channel representing chroma components, the single color channel being the Y channel, the representing comprising:
preserving the Y channel of the HDR image; and
dividing the Cb channel and the Cr channel by the Y channel;
quantizing (402) the single color channel different from other color channels to generate quantized information (122), the quantizing comprising dividing a single luminance range of the HDR image into a first luminance range and a second luminance range based on a criteria that minimizes total quantization error as a function of numbers of luminance pixels associated with the first luminance range and the second luminance range; and
compressing (408) each block (122) of multiple blocks of the quantized information of the HDR image to create a first HDR texture and a second HDR texture (116), the compressing comprising:
encoding pixels associated with the first luminance range into a particular color channel associated with the first HDR texture (116) via a first texture compression algorithm; and
encoding pixels associated with the second luminance range into a particular color channel associated with the second HDR texture via a second texture compression algorithm different from the first texture compression algorithm.

2. The method of claim 1, wherein quantizing further comprises:
quantizing (402) the other color channels using a single uniform luminance range (122).

3. The method of claim 1, wherein the first HDR texture and the second HDR texture represent respective RGB colors, and wherein the compressing (406) further comprises:
mapping pixels associated with the Y channel (122) to two R channels or to two G channels of the first HDR texture and the second HDR texture, and
mapping Cb and Cr channels (122) into respective B channels of the first HDR texture and the second HDR texture.

4. The method of claim 1, wherein the first HDR texture and the second HDR texture represent respective RGB colors in RGB color space having an R channel, a G channel, a B channel and an A channel, and wherein compressing (406) further comprises:
mapping pixels associated with the Y channel (122) to the B channel of the first HDR texture (116) and the R channel of the second HDR texture (116), or mapping pixels associated with the Y channel (122) to the G channel of the first HDR texture (116) and the B channel of the second HDR texture (116); and
mapping pixels associated with the Cb and Cr channels (122) into respective A channels of the first and second HDR textures (116).

5. The method of claim 1, further comprising decoding (408), using graphics decompression hardware (102), the first and second HDR textures (116) to render at least a portion of the HDR image (122), the decoding being independent of whether the graphics decompression hardware (122) is designed to decompress images having only fewer bits per color channel than the HDR image (114).

6. The method of claim 1, wherein the method further comprises segmenting (404) the quantized HDR image (122) into multiple blocks (122), each block having a bit-width less than color channel bit-width of the HDR image and less than or equal to a compatible bit-width of texture decompression hardware (102) designed to decompress images having fewer bits per color channel then the HDR image (114).

7. A computer-readable storage medium comprising computer-program instructions executable by a processor, the computer-program instructions, when executed by the processor for performing acts comprising:
receiving a request for a texture pixel (texel) associated with a high dynamic range (HDR) image;
responsive to receiving the request, decompressing two encoded HDR textures to obtain the texel for rendering, the decompressing using two ranges of luminance values associated with a particular one color channel of the encoded HDR textures to generate bit values of the HDR image, the one color channel representing HDR, different color channels of the encoded HDR textures not representing HDR, wherein the two ranges of luminance values are selected based on criteria that minimize total quantization error as a function of numbers of luminance pixels associated with the two luminance ranges;
wherein the decompressing further comprises:
fetching low and high bit values associated with the texel from first and second encoded HDR textures;
calculating a single pixel value based on an algorithm, wherein the algorithm reconstructs the texel associated with the different color channels in a different manner depending on which one of the two ranges of luminance values the single pixel is associated with; and
converting the single pixel value, using two ranges of luminance values associated with a Y color channel of the encoded HDR textures, to generate an interpolated value for associating with a target color space as the texel, the two ranges of luminance values having been used to determine where quantized pixels associated with the HDR image were stored in the first and second encoded HDR textures.

8. The computer-readable storage medium of claim 7, wherein the two encoded HDR textures represent a single compressed block of multiple blocks of the HDR image, and wherein decompressing operations are performed in real-time.

9. The computer-readable storage medium of claim 7, wherein operations to decompress the two encoded HDR textures are performed by graphics hardware.

10. The computer-readable storage medium of claim 7, wherein operations to decompress the two encoded HDR textures are performed by graphics hardware, and wherein the graphics hardware is designed to decompress compressed textures with fewer bits per color channel than color channels associated with the HDR image.

11. A computing device comprising:
a processor; and
a memory coupled to the processor, the memory comprising computer-program instructions executable by the processor for:
preprocessing a high dynamic range (HDR) image to create quantized information for compression into multiple encoded HDR textures, the HDR image being in YCbCr color space that includes a Y channel representing luma component, a Cb channel and a Cr channel representing chroma components, the preprocessing comprising:
quantizing the Y channel using two luminance ranges, the two luminance ranges being calculated based on a criteria that minimizes total quantization error as a function of numbers of luminance pixels associated with the two luminance ranges, wherein the Y channel is quantized to represent HDR of the HDR image; and
quantizing the Cb channel and the Cr channel using a single uniform range, wherein the Cb channel and the Cr channel do not represent HDR of the HDR image after the quantizing;
compressing the quantized information into two encoded HDR textures by using two different texture compression algorithms to encode pixels of the HDR image;
receiving a request for a texture pixel (texel) associated with a portion of the HDR image used to create the two encoded HDR textures; and
decompressing the two encoded HDR textures to obtain the texel for rendering, the decompressing comprising using the two ranges of luminance associated with the Y channel of the encoded HDR textures to generate bit values of the HDR image.

12. The computing device of claim 11, wherein the computing device is programmable graphics hardware.

13. The computing device of claim 11, wherein the two encoded HDR textures are generated with DXT1 or DXT5-compatible encoding.

14. The computing device of claim 11, wherein the computer-program instructions for compressing further comprise instructions for encoding the quantized HDR image into multiple encoded HDR textures based on the luminance ranges.

15. The computing device of claim 11,
wherein the two encoded HDR textures represent respective RGB colors, and
wherein the compressing further comprises mapping pixels associated with the Y channel to two R channels or to two G channels of the two respective textures, and mapping the Cb channel and the Cr channel into respective B channels of the two respective textures.

16. One or more computer-readable storage medium having stored thereon a plurality of computer-program instructions that, when executed on a computing device having one or more processors, cause the one or more processors to perform the method as recited in claim 1.

* * * * *